United States Patent [19]

Ritter et al.

[11] Patent Number: 5,046,794
[45] Date of Patent: Sep. 10, 1991

[54] HOLOGON SCANNER SYSTEM

[75] Inventors: Joachim A. Ritter; Mehdi N. Araghi, both of Webster; Charles J. Kramer, Rochester, all of N.Y.

[73] Assignee: Holotek Ltd., Rochester, N.Y.

[21] Appl. No.: 503,400

[22] Filed: Mar. 30, 1990

[51] Int. Cl.$^5$ .......................... G02B 5/32; G02B 26/10
[52] U.S. Cl. ........................................ 359/18; 359/566
[58] Field of Search ....................... 350/3.71, 6.6, 6.7, 350/6.9, 162.17

[56] References Cited

U.S. PATENT DOCUMENTS

| | | | |
|---|---|---|---|
| 3,614,193 | 10/1971 | Beiser | 350/3.71 |
| 3,721,487 | 3/1973 | Pieuchard et al. | 350/3.71 |
| 3,795,768 | 3/1974 | Locke . | |
| 3,980,389 | 9/1976 | Huignard et al. | |
| 4,094,576 | 6/1978 | Heiling | 350/3.71 |
| 4,224,509 | 9/1980 | Cheng | 350/3.71 |
| 4,337,994 | 7/1982 | Brasier | 350/3.71 |
| 4,428,643 | 1/1984 | Kay | 350/3.71 |
| 4,540,247 | 9/1985 | Nishi et al. | 350/3.71 |
| 4,591,236 | 5/1986 | Broockman et al. | 350/3.71 |
| 4,610,500 | 9/1986 | Kramer | 350/3.71 |
| 4,655,541 | 4/1987 | Yamazaki et al. | 350/6.2 |
| 4,799,164 | 1/1989 | Hellekson et al. | 350/3.71 |
| 4,800,547 | 1/1989 | Kessels et al. | 350/3.71 |
| 4,840,443 | 6/1989 | Debesis | 350/3.71 |
| 4,852,956 | 8/1989 | Kramer | 350/3.71 |
| 4,904,034 | 2/1990 | Narayan et al. | 350/3.71 |
| 4,973,112 | 11/1990 | Kramer | 350/3.71 |

FOREIGN PATENT DOCUMENTS

| | | | |
|---|---|---|---|
| 1143194 | 3/1983 | Canada . | |
| 0069306 | 1/1983 | European Pat. Off. | 350/3.71 |
| 60-172016 | 9/1985 | Japan | 350/3.71 |

OTHER PUBLICATIONS

Flamand et al., "High Rate and Resolution Scanning Possibilities . . .," *Proc. E. O. Syst. Des. Conf.*, 1973, pp. 1-9.
Wolfheimer, "Holographic Disc Test Apparatus," *IBM Technical Disclosure Bulletin*, vol. 25, No. 11B, Apr. 1983, pp. 6280-6281.
Cindrich, "Image Scanning by Rotation of a Hologram," *Applied Optics*, vol. 6, No. 9, Sep. 1967, pp. 1531-1534.
Kramer, "Hologon Deflectors Incorporating Dispersive Optical Elements . . .," *SPIE Proceeding on Holographic Optics: Design and Applications*, vol. 883, Jan. 13-14, 1988, pp. 1-15.
Kramer, "Hologon Laser Scanners for Nonimpact Printing," *SPIE Proceedings on High Speed Read/Write Techniques*, vol. 390, Jan. 20-21, 1983, pp. 165-173.

*Primary Examiner*—Bruce Y. Arnold
*Assistant Examiner*—Martin Lerner
*Attorney, Agent, or Firm*—Martin LuKacher

[57] ABSTRACT

A hologon scanning system which provides two sequential scans across an image plane per revolution of the hologon. The hologon is a disc having a single facet with a planar linear diffraction grating in a surface which is perpendicular to the axis of rotation of the disc and which is centered on the axis of rotation. An incident laser beam which preferably overfills the facet is diffracted and scanned by the rotation of the facet. The facet is preferably elliptical in shape with its major axis perpendicular to the facet grating lines. The diameter of the disc can be made only slightly larger than the profile of the incident beam on the disc so as to minimize inertia and enable the disc to be rotated at very high speeds without failure due to centrifugal force induced stress. Four sequential scans per revolution can be produced by using a pair of superimposed centered facets with their grating lines oriented orthogonally to each other. This monograting disc deflector provides a cost-effective scanner solution for high resolution, flat field imaging applications.

15 Claims, 6 Drawing Sheets

HOLOGON SCANNER SYSTEM

DESCRIPTION

The present invention relates to laser scanning systems and particularly to a scanning system using a hologon deflector (diffraction grating based deflector element) which is rotatable about an axis and has at least one grating element (a monograting).

The invention is especially suitable for use in laser printers and scanning systems for the accurate reproduction of images, and particularly where high resolution, flat field imaging is desired.

It is the principal object of this invention to provide a cost-effective scanning system having a planar, preferably disc shaped, hologon deflector which provides two sequential scans per rotation of the disc without the need for a plural of facets or multiple simultaneous scanning beams.

Current disc hologon laser beam deflectors, as illustrated in FIG. 1 of an article by Charles J. Kramer entitled, "Hologon Laser Scanners For Nonimpact Printing," which appeared in Volume 390 of the Proceedings of SPIE (1983), have between one and thirty grating facets arranged in an annular band radially spaced from the center of the disc. The disc is rotated about its center by a rotor attached to the disc's center. The incident laser beam is positioned on the disc so that it strikes the disc at the radial distance corresponding to the middle of the facet band, thereby sequentially intersecting individual facets as they are translated through the beam. The finely spaced grating grooves of each facet diffract the incident beam through an angle and the disc rotation action causes the diffracted beam to scan a line. A fairly large number of scans (one for each facet) can be achieved for each revolution of the disc.

In many high resolution imaging applications such as laser typesetters or image scanners, high scan rates (scans per second) are not required. Scan rates for many of these high resolution imaging applications are limited by the speed of the raster imaging processing (RIP) computer hardware and software. Scan rates of 100 to 200 per second are adequate for many of these high resolution imaging applications. These scan rates can be achieved using a single facet hologon with the facet spaced from the center of the disc or a double facet hologon. A drawback of such deflectors is that their dimensional size in the direction of rotation must be significantly larger than the incident beam in that direction, especially when the hologon is used in the underfilled facet mode as illustrated in FIG. 2 of the above-referenced Kramer publication. By underfilled, as opposed to overfilled facet mode, is meant that the incident laser beam area where it intersects the facet is smaller in the underfilled mode and larger in the overfilled mode, than the facet.

The size constraints of conventional hologon deflectors and fabrication requirements tend to make them costly. For example, the incident beam diameter for high resolution imaging applications is typically in the range of about 25 millimeters (mm). If the incident beam angle $\theta_i$ is 30°, the facet must have a radial width of about 30 mm. If the scan duty cycle is 50%, the mean facet circumference length must be greater than 50 mm. When center and edge hologon disc clearances are accounted for, a disc having a 90 mm to 101 mm diameter is typically required to fabricate a hologon having even a single off-axis facet of this size. A disc substrate of this size must be twin ground and polished to about one arc second or less of parallelism if more than one facet is used on the disc. Even for single facet operation, the substrate must be anti-reflection crated to achieve less than 0.2% reflectivity in order to insure scan beam intensity uniformity.

It has been proposed to use a single planar diffraction grating disposed at an angle or about 45° to the axis of its rotation. Such a deflector is described in an article by Charles J. Kramer entitled, "Hologon Deflector For High Resolution Internal Drum and Flat Field Imaging," which was presented at an SPIE meeting in Los Angeles, Calif. on Jan. 15-20, 1989 and published in the Proceedings of SPIE Volume 1079, Page 427. This deflector is also the subject of U.S. Pat. No. 4,852,956, issued Aug. 1, 1989. Such deflectors provide only one scan per revolution. There have also been proposed monograting deflectors where the incident beam is perpendicular to the plane of the grating (See Locke, U.S. Pat. No. 3,795,768, Mar. 5, 1974). Such deflectors provide a circular scan and only one scan of an image plane. By an image plane is meant either a flat or cylindrical image plane. A similar monograting using an on-axis beam which provides a single scan is shown in an article by J. Flamand and G. Pieuchard entitled, "High Rate Resolution Scanning Possibilities With Rotating Stigmatic Holographic Gratings," which appeared in the Proceedings E-O Syst. Des. Conference, 322-27 (1973).

The present invention provides a cost-effective solution for high resolution flat field imaging applications as are required by many types of laser typesetters and imagesetters. The cost of a hologon scanning system embodying the invention can be considerably reduced over conventional disc hologon scanning systems by reducing the diameter of the element (the hologon disc) to about 40 mm and eliminating the requirement for a center hole by holding the hologon disc at its outer rim. A single grating facet can be centered on the deflector rotation axis. Deflector size, construction complexity and cost are minimized because both the facet and incident beam profile on the hologon are centered on the deflector rotational axis, and therefore both the facet and disc diameter need only be slightly larger than the incident beam diameter. This enables the hologon to be rotated at high speeds (for example between 30,000 and 50,000 rpm) without failure (rupturing) due to centrifugal force induced stress thereby enabling high scanning speeds to be obtained. Most important, however, is that a pair of sequential scans are provided for each revolution of the disc. The incident beam is not perpendicular to the plane of the grating, but rather is at an angle of incidence from 25° to 45°, thereby assuring that only the first order diffraction is obtained with minimum energy in other orders. Blocking of other orders is not required and resulting interference from other orders is avoided.

By utilizing an overfilled facet, ellipticity of the image spot is obviated and a circular spot of uniform intensity is produced at the image plane during each of the scans. If more than two sequential scans per revolution are required, another grating can be superimposed, for example with its lines perpendicular (orthogonal) to the lines of the first grating. Then a second pair of sequential scans is produced, each in the interval between the scans of the first pair. Additionally angularly offset gratings may be used if additional sequential scans are needed. In each case, the grating facets are centered on the rotation axis and the incident beam (25° to 45° angle of incidence) is also centered on the rotation axis.

It is one of the principal objects of the present invention to provide an improved hologon scanning system in which fabrication cost is reduced over conventional scanning systems which have their hologon diffraction grating facets arranged in an annular band spaced from the axis of rotation and especially which are operated in the underfilled facet mode.

It is another object of the present invention to provide an improved hologon deflector system in which ellipticity of the image spot is reduced and an essentially circular spot is scanned across the image plane.

It is a still further object of the invention to provide an improved hologon deflector system which is immune from periodicity error while providing two scans per revolution.

It is a still further object of the present invention to provide an improved hologon scanner system which is easily adjusted for parallelism so as to reduce tracking error due to substrate wedge or deflector wobble.

It is a still further object of the present invention to provide an improved hologon deflector system which enables fast scan rates to be achieved because of the use of a relatively small hologon deflector as compared to the hologon disc of conventional deflector systems thereby reducing the effects of centrifugal force induced stress.

Briefly described, a hologon scanning system embodying the invention provides a pair of beams of light which sequentially scan across an image plane and makes use of a hologon element in the form of a member having a planar diffraction grating (grating lines are in a plane). The grating is preferably a planar linear diffraction grating with parallel uniformly spaced grating lines which are holographically formed. Means are provided for holding and rotating the member about an axis of rotation perpendicular to the plane of the grating and intersecting the grating, preferably at the center thereof. Means are provided for illuminating the grating with a beam of light which is incident on the grating at the rotation axis (where the axis intersects the grating) and at an angle of incidence from about 25° to 45° and preferably about 25° so that the beam is diffracted to produce a pair of sequential scans across the image plane per revolution of the member.

The foregoing and other objects, features, and advantages of the invention, as well as presently preferred, embodiments thereof, will become more apparent from a reading of the following description in connection with the accompanying drawings in which.

Figure 1:
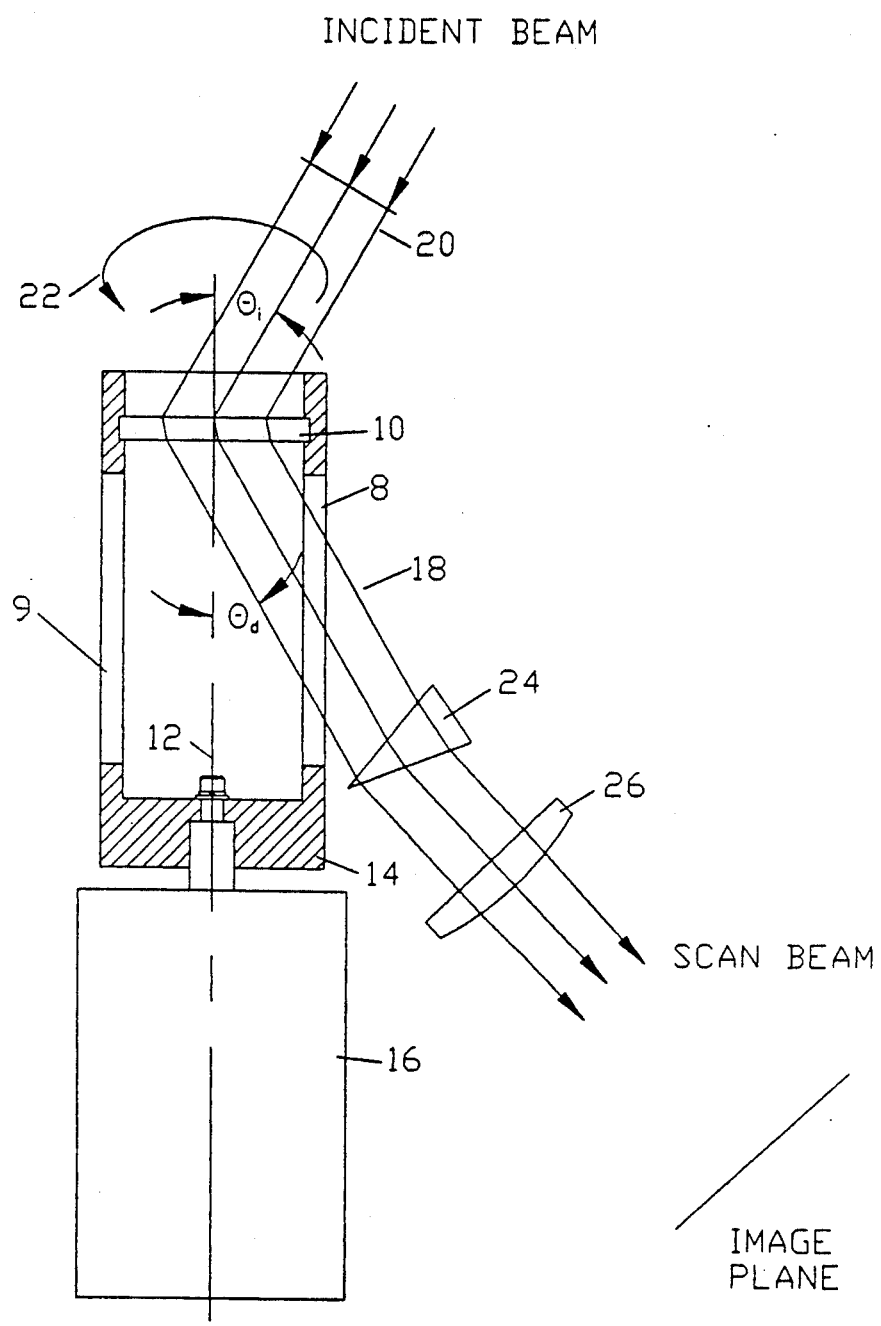
FIG. 1 is a schematic diagram showing a hologon scanning system in accordance with an embodiment of the invention.

Referring to FIG. 1, there is shown a hologon member in the form of a disc 10 having a single planar diffraction grating facet therein. The facet is centered about the rotation axis 12 of the disc which is held at the upper end of a cylindrical housing (holder) 14 and rotated by a motor 16. The housing 14 holds and spaces the grating facet in the member 10, which may be formed at the lower surface of the member, so that it holds and spaces the facet from the drive motor. The motor 16 then does not block the transmitted diffracted beam 18. The incident beam 20 makes an angle $\theta_i$ of approximately 30° with regard to the normal of the grating facet surface (the rotation axis 12). The transmitted diffracted beam angle $\theta_d$ is also approximately 30°. The ratio of the light beam wave length $\lambda$ to the grating period D is $\lambda/D$ equals K equals 1.0. For this K value, the scan beam angle, $\theta_s$ is equal to the grating facet rotation angle $\theta_R$ because $\theta_s$ is approximately equal to $K\theta_R$.

The grating facet 10 is angularly oriented within the cylinder housing so that the grating lines of the facet are perpendicular to the axis 12 so that the diffracted beam then passes through a first opening 8 and then a second opening 9 as the facet rotates through 180°. These openings are diametrically opposite to each other and are arranged so that a line through their centers is perpendicular to the lines of the grating and intersects the axis 12. These openings are in the side walls of the cylindrical housing. In the rotation direction, the openings need only be slightly larger than the diffracted beam diameter because K equals 1.0. For the case where $\theta_i$ is approximately equal to $\theta_d$ is approximately equal to 45°, K equals 1.4142, and therefore the side wall openings 8 and 9 in the rotation direction must be sufficiently larger than the diffracted beam to account for the difference between $\theta_s$ and $\theta_R$. Two scans are produced, one through each of the openings 8 and 9, per revolution of the grating facet 10 for the angular rotation indicated by the arrow 22 in FIG. 1. The diffracted beam passes through the opening 8, indicating that the grating lines of the plane grating facet are oriented perpendicular to the plane of the Figure. When the facet is rotated 180° from its depicted position, the grating lines are also perpendicular to the plane of the Figure. Under these conditions, the incident beam is diffracted in the same direction as indicated in FIG. 1, but now passes through the opening 9. It will be evident from the preceding description and the Figure that the grating lines of the facet have the same relative orientation with respect to the incident beam for 180° different rotation positions, and therefore, two sequential scans are achieved for each complete rotation (revolution) of the hologon disc 10. The single centered grating facet functions like a sequence dipole radiator. By using equal angles of incidence and diffraction and an incidence angle $\theta_i$ equal or greater than 25°, it is ensured that the scan beam tracking error is very insensitive with respect to deflector wobble and that the dipole facet only radiates significant energy into the positive first diffracted order direction. This latter feature of the sequence dipole facet enables high radiometric system throughout efficiency to be achieved. Having $\theta_i \approx \theta_d$ and $K > 0.8$, ensures that both the scan beam tracking error is very insensitive with respect to deflector wobble and that the dipole facet only radiates significant energy into the positive first order diffracted beam. This latter feature of the sequential dipole facet enables high radiometric system throughout efficiency to be achieved.

Having two sequential scans per revolution not only doubles the scan rate, but also doubles the scan duty cycle for the system. The scan duty cycle for the FIG. 1 is determined by the angular duty cycle, $U_a$ of the system. If $\theta'_s$ is the half scan angle of the focusing lens, $U_a$ for the sequence dipole grating facet deflector illustrated in the FIG. 1 having $\theta_i$ approximately equal to $\theta_d$ is:

$$U_a = \frac{Z\theta'_s}{\pi K}$$

Scan duty cycle for this dipole geometry can only be improved by increasing the scan angle of the system or by reducing the K value of the grating facet. Scan angle for the dipole disc deflector is still limited to ±20° due to scan-line bow and scan beam tracking error sensitivity with regard to deflector wobble.

The diffracted beam 18 in FIG. 1, after passing through the opening is incident on a prism element 24 that is used to compensate for the scan bow in the scan beam exiting from the grating facet. Further information concerning the use of such prisms will be found in an article by Charles J. Kramer entitled, "Hologon Deflectors Incorporating Dispersive Optical Elements For Scan Line Bow Correction" which appeared in the SPIE Proceedings on Holographic Optics: Design and Applications, Volume 883, Page 230, January 1988; and also in U.S. patent application Ser. No. 278,632 filed Dec. 1, 1988 by Charles J. Kramer and entitled, "Hologon Deflector System Having Dispersive Optical Elements For Scan Line Bow Correction, Wave Length Shift Correction and Scanning Spot Ellipticity Correction", now U.S. Pat. No. 4,973,112 issued Nov. 27, 1990.

The scan beam after exiting the prism 24 is incident on the focusing lens 26 that images the collimated beam to a scanning spot at the image plane.

In the event that the prism element and focusing lens is to be located closer to the hologon 10 so as to provide a smaller package, which may be more desirable in portable or tabletop scanners and typesetters or otherwise where it is not desired for the focusing lens to be fairly far from the hologon which corresponds to the center of scan and therefore to avoid the need for fairly large in-scan dimensions, the distance between the focusing lens and the grating can be reduced by using a grating K value of 1.4142 and $\theta_i$ approximately equal to $\theta_d$ approximately equal to 45°. The major disadvantage of using the higher K value grating is that the scan duty cycle of the deflector is reduced by the ratio in the K values when a fixed scan angle focusing lens is used.

Figure 2:
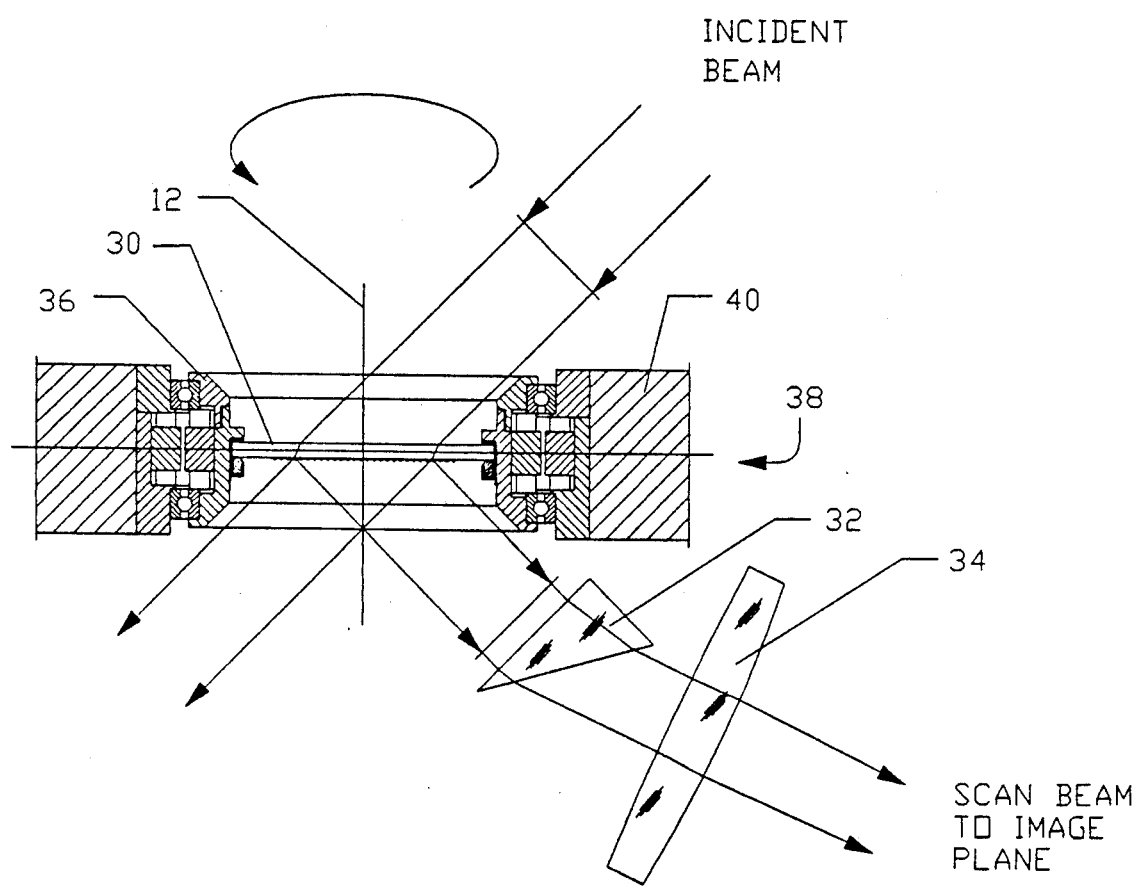
FIG. 2 is a schematic diagram of a hologon scanning system in accordance with another embodiment of the invention.
Figure 8:
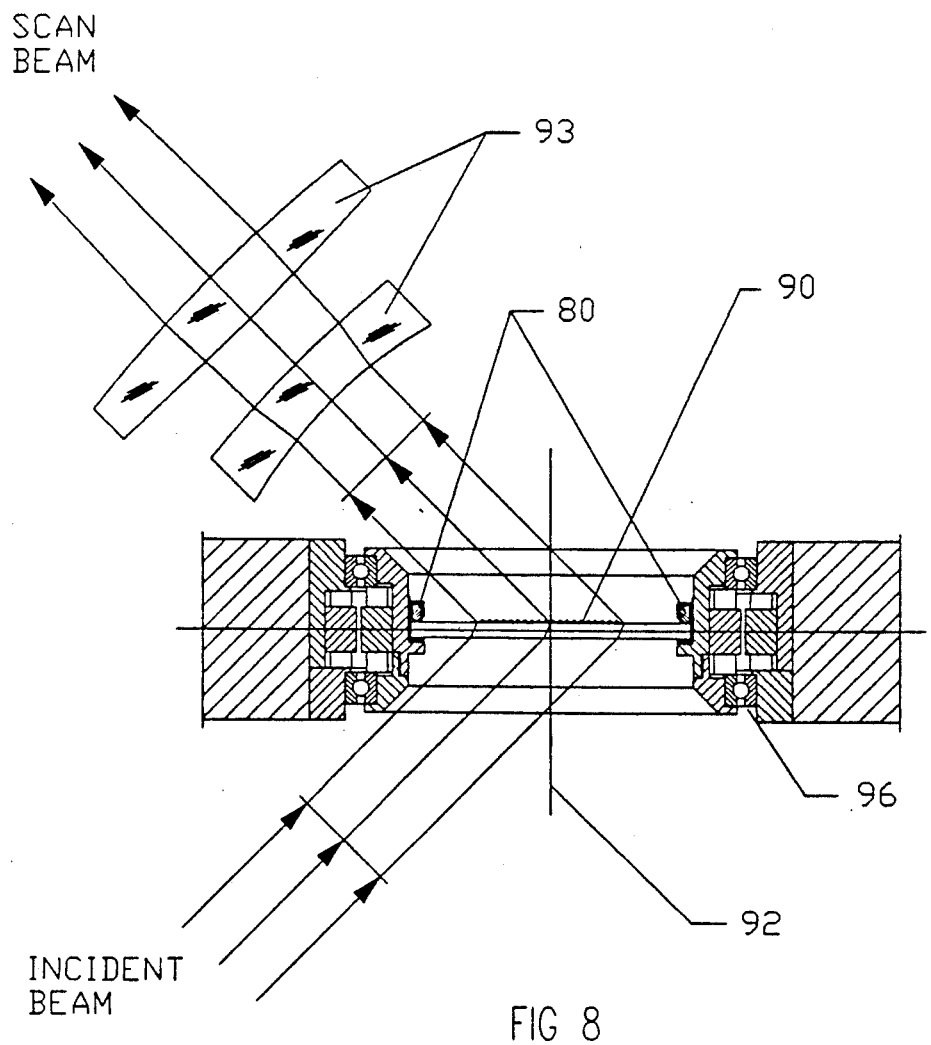
FIG. 8 is a schematic sectional view of a scanning system in accordance with still another embodiment of the invention.

Referring to FIG. 2, which is similar to FIG. 8, another embodiment of the invention is provided which enables the distance between the grating facet 30 and the prism 32 and focusing lens 34 to be significantly reduced from the distance of these elements as shown in FIG. 1. This reduction is accomplished by placing the grating facet or hologon 30 in the middle of a pancake motor assembly. In other words, the rim of the facet is connected to the rotor 36 of a pancake motor assembly 38. The stator 40 encompasses the grating and the rotor. Such pancake motors are commercially available and have a small thickness which enables the prism 32 and the focusing lens to be positioned relatively close to the center of scan thereby reducing their in-scan dimensions.

Figure 3:
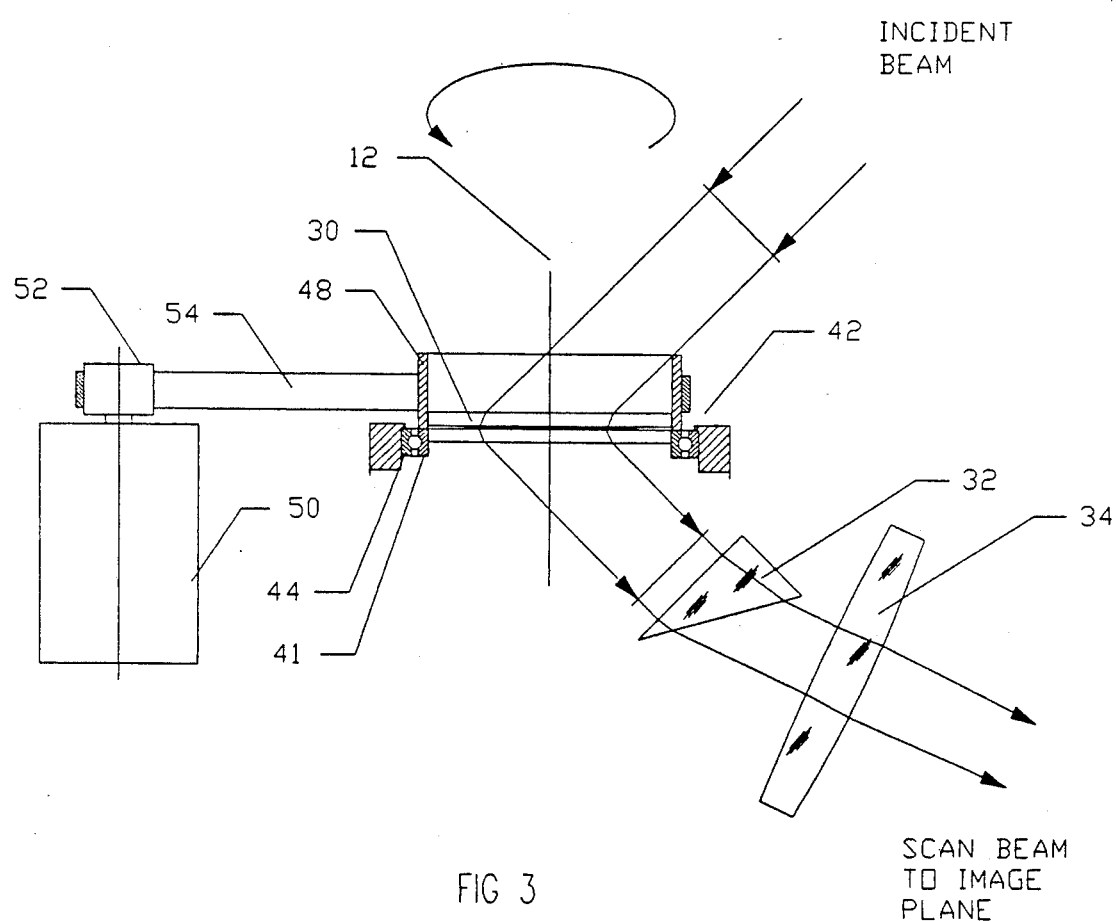
FIG. 3 is a schematic diagram illustrating a hologon scanning system in accordance with still another embodiment of the invention.

Referring to FIG. 3, a similar arrangement of hologon 30, prism 32, and focusing lens 34 is used. The hologon 30 is attached at its rim to the inner race 41 of a bearing assembly 42. The outer race 44 is held stationary. The inner race is connected to a ring pulley 48. A motor 51 drives a pulley 53 which is connected by a drive belt 55 to the pulley 48. This drive belt configuration offers greater asymmetry in construction of the system and may enable the prism and focusing lens to be placed nearer to the center of the facet. The facet center and the beam are all coincident with the rotation axis 12.

As explained in the above-referenced 1988 SPIE Proceedings article and in the U.S. Pat. No. 4,793,112, one of the problems associated with hologon deflector systems generally is that the image spot size becomes elliptically shaped as the beam is scanned off axis. This spot ellipticity increases as a function of scan beam angle for a disc hologon deflector and is one of the factors which limits the useful scan angle of these deflectors (of the conventional type as is illustrated in the above referenced 1983 SPIE Proceedings article) to less than ±20° for high resolution imaging applications. Image spot ellipticity occurs in disc hologon deflectors because the incident beam on the grating facet has an elliptical shape as seen in FIG. 2 of the 1983 SPIE article, that remains stationary with regard to the scanning beam. The projection of this elliptically shaped beam aperture along the diffracted scan beam is circular for the center of scan position when the incident beam to the hologon is circular. The off-axis projection of the elliptically shaped aperture gives rise to an elliptically shaped scan beam because the fixed elliptical aperture has the wrong projected cross-sectional shape to produce a circular beam profile.

The misalignment between the fixed beam aperture shape and the required aperture shape for a circular beam profile increases with scan angle, and therefore, image spot ellipticity increases with scan angle. The major and minor axes of the resulting elliptical image spot increase and decrease symmetrically in size from the center of scan circular cross-section value. These major and minor axes are oriented at about 45° to the scan line direction, with the relative direction of both changing sense (clockwise to counterclockwise and vice versa) as the scan beam passes through the center of scan.

Figure 4:
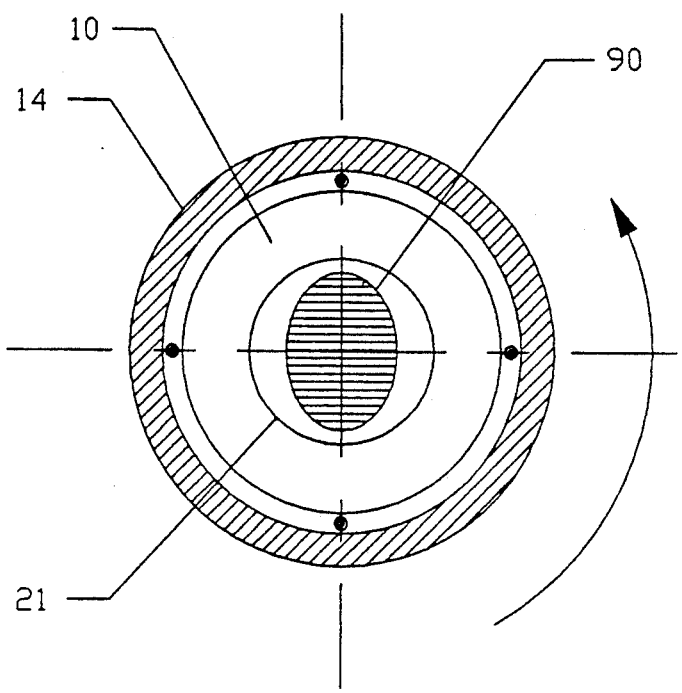
FIG. 4 is a top view of the device of FIG. 5 and showing the hologon and the means for holding and rotating the hologon in a system of the type illustrated in FIG. 1.

The spot ellipticity either increases or decreases the overlap of successive scan lines in a direction that is 45° to the scan direction. This change in overlap affects the quality of lines or half tone dots oriented in these directions. These problems and some solutions therefor are discussed in the 1988 SPIE Proceedings article and in the U.S. Pat. No. 4,973,112, referenced above. It has been found useful to reduce or eliminate the spot ellipticity by using, instead of an underfilled facet technique shown in the 1983 SPIE article, an overfilled facet where the incident beam has a profile on the hologon 10 that is significantly larger than the facet aperture. The desired beam aperture can be provided by making the grating facet 90 in elliptical shape slightly smaller than the incident beam profile 21 as shown in FIG. 4 or with an apodizing aperture. The major axis of the elliptical facet 90 in FIG. 4 is perpendicular to the grating lines while the minor axis is parallel to the grating lines. Since the facet is centered on the deflector rotation axis as shown in FIG. 4, it changes its angular orientation to track the scan beam without translation across the incident beam profile 21. The scan beam cross-sectional profile is determined by the facet aperture shape, the scan beam cross-sectional profile being essentially constant with respect to scan angle. The scan line has good radiometric uniformity and can have high radiometric throughout efficiency since the incident beam profile need only be slightly larger than the facet aperture as shown in FIG. 4 and the scan beam entrance pupil is fixed which allows a smaller focusing lens to be used. Normally the incident beam profile 21 on the hologon disc 10 would be elliptically shaped as opposed to the circular profile shown in FIG. 4. Under those conditions, the radiometric intensity of the scan beam would increase very slightly with scan angle.

Figure 5:
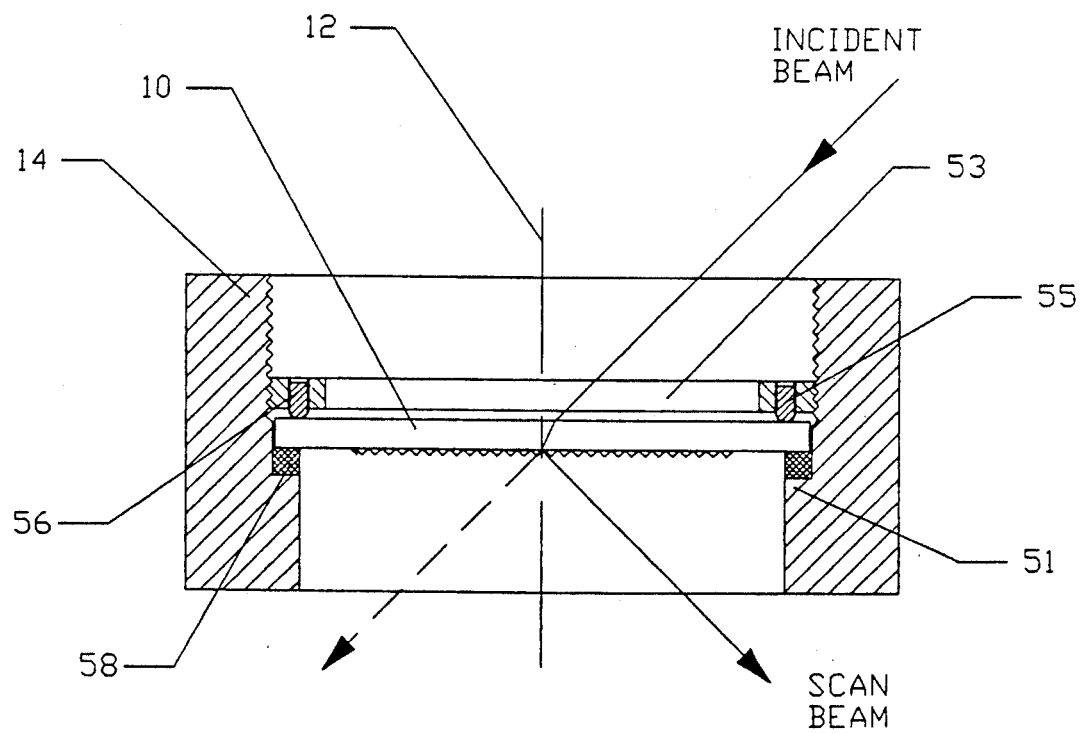
FIG. 5 is a fragmentary sectional view in elevation illustrating the upper portion of a holding and rotating housing for the hologon with the hologon therein which is provided in accordance with an embodiment of the invention.

Another feature of the deflector system is illustrated in FIG. 5 and will be evident from the following equation:

$$d\theta_h = \pm \left[ 1 \mp \frac{\cos(\theta_i + \phi)}{\cos(\theta_d \mp \phi)} \right]$$

In the equation $d\theta$ is the change in the hologon orientation due to wobble and $d\theta_h$ is the change in the diffracted beam angle with respect to the image plane coordinates. This equation is explained further in the above-referenced 1988 SPIE article.

Figure 9:
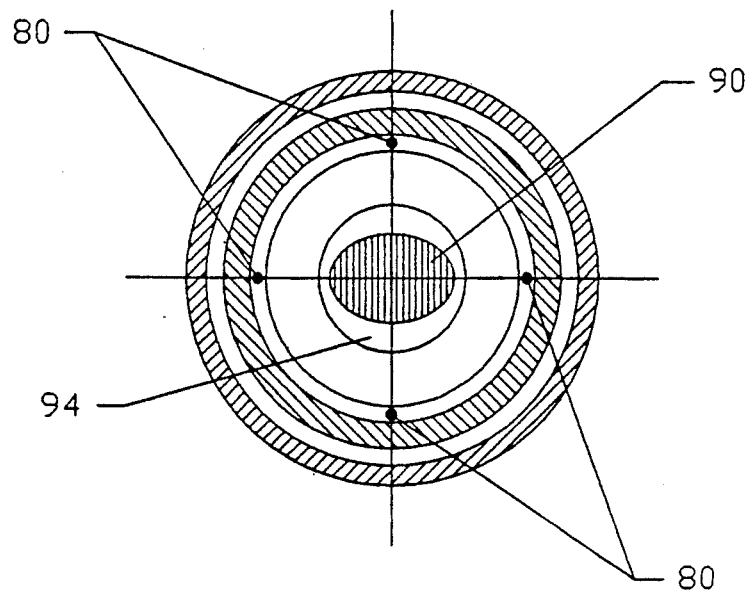
FIG. 9 is a top view of FIG. 9 without the motor support shown in FIG. 8.

It will be apparent from Equation 2 that if the fixed periodic deflector wobble is reduced to less than $\pm 30$ arc seconds, the scan beam tracking error between scans for the dual scan per revolution case where K equals 1.0 would be less than 1 arc second. In FIG. 5 the cylindrical housing 14 has a step 51 and the inside surface above the step is threaded so as to receive a retaining ring 53. This ring 52 has at least one adjusting screw 55 and may have three adjusting screws 120° apart or four as shown in FIG. 9. Another of these screws 56 is illustrated in FIG. 5. The hologon disc 10 is sandwiched between the retaining ring and a yieldable ring 58. In other words the disc 10 is clamped between the yieldable ring and the retaining ring. The yieldable ring may be a rubber spacer or other elastic material ring and may be a Bellevile spring washer element. The adjustment screws in the retaining ring alter the tilt angle of the disc relative to the cylindrical housing 14 and the axis of rotation 12, by causing the yieldable ring material to compress. The tilt angle of the hologon disc can be adjusted so that its fixed periodic wobble is reduced to less than $\pm 30$ arc seconds, and thereby, the scan tracking angle between scans is reduced to less than 1 arc second for the dual scan per revolution case. After the tilt adjustment is completed, the adjustment screws can be locked into position by means of cement.

Since substrate wedge causes the same type of scan beam tracking error as does disc wobble, the adjustment screw arrangement shown in FIG. 5 will also compensate for tracking error associated with substrate wedge. This enables cost of the scanning system to be reduced since it allows the use of hologon substrate discs with more substrate wedge than allowed by conventional design.

It is apparent from the drawing and particularly from FIG. 4 that the disc diameter of the hologon discs are relatively small and are approximately equal to the incident beam profile and only slightly being larger only to enable the incident beam to avoid obstructions by the edges of the cylindrical housing 14. Therefore the discs can be rotated to very high speeds without rupturing due to centrifugal force induced stress. The motor assembly may, for example, be of the air-bearing/air-turbine type thereby enabling the hologon disc to rotate at speeds between 30,000 and 50,000 rpm while achieving reliable running life. If additional inertia is necessary, flywheels may be added to the deflector system. Rotational inertia helps reduce the motor hunting found in all rotating deflector systems. Additional rotational inertia can be added to the deflector assembly and/or better speed motor controls used with it. One can also use a grating pixel clock to measure rotational speed variations within a scan, and thereby, correct for it.

Figure 6:
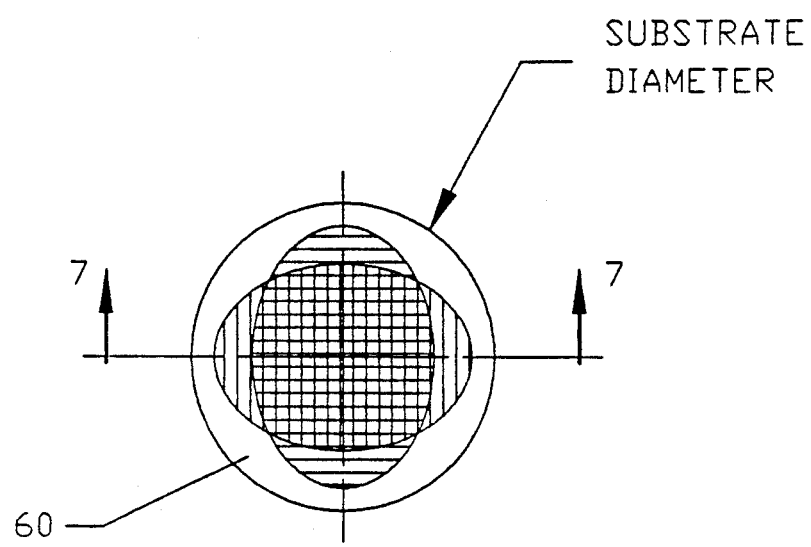
FIG. 6 is a plan view of a hologon element with two superimposed gratings.
Figure 7:
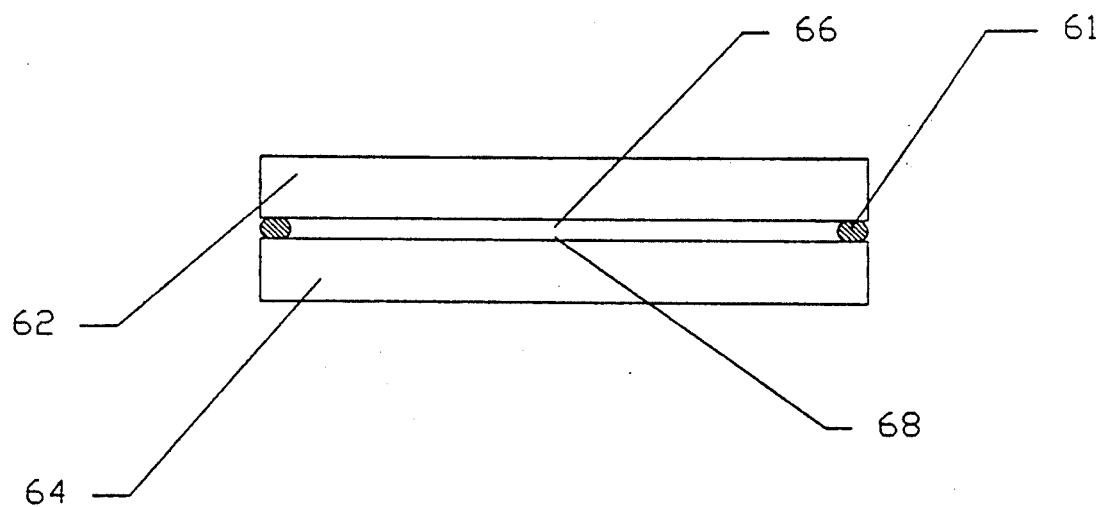
FIG. 7 is a sectional view of FIG. 6 taken along the line 7—7 (the x axis) in FIG. 6.

Referring to FIGS. 6 and 7, there is shown a hologon disc assembly 60 made up of upper and lower discs 62 and 64 with gratings formed, as by holographic techniques on surfaces 66 and 68. Gratings 62 and 64 are oriented so that their grating lines are perpendicular to each other. Surfaces 66 and 68 are spaced by an annulus of holding material 61 such as glue which assembles the hologon element 60. The orthogonal, superimposed gratings are in overlapping or overlaid relationship. Alternatively, a grating on a single surface may be made using a double exposure with the hologon turned 90° for each exposure. The hologon deflector 60 then provides two pairs of sequential scans or four successive scans per rotation of the hologon disc. Then an additional two openings displaced 90° from the openings 8 and 9 in FIG. 1 are required.

Referring to FIGS. 8 and 9 a unique hologon disc deflector system is shown that employs a single PDG (plane diffraction grating) facet 90 centered on the deflector rotation axis 92. This deflector can be used with the overfilled facet technique described above. FIG. 8 illustrates a centered grating facet that is over-illuminated by an incident beam that has a circular cross-section profile on the hologon disc as shown at 94 in FIG. 9. Since the facet aperture is centered on the deflector rotation axis, it changes its angular orientation to track the scan beam without translation across the incident beam profile. For this deflector geometry: the scan beam cross-sectional profile is determined by the facet aperture shape; the scan beam cross-sectional profile is essentially constant with respect to scan angle; the scan line has very good radiometric uniformity; the deflector can have high radiometric throughout efficiency since the incident beam profile need only be slightly larger than the facet aperture; and the scan beam entrance pupil is fixed which allows a smaller focusing lens design. Normally, the incident beam profile on the hologon disc would be elliptically shaped as opposed to the circular profile shown at 94 in FIG. 9. When the incident beam profile is elliptically shaped, the radiometric intensity of the scan beam would increase very slightly with scan angle.

The single centered grating facet disc in FIGS. 8 and 9 is positioned in the middle of the motor assembly 96. The motor assembly in FIG. 9 is depicted as being of the pancake DC torque motor type. This type of motor could also be constructed using circuit board technology, thereby enabling it to be manufactured relatively inexpensively. A pancake motor geometry can also be achieved by using a small gas turbine to actuate the rotation of the disc assembly. The small thickness of the pancake motor enables the focusing lens 93 to be positioned relatively close to the center of scan, thus reducing its in-scan dimension. This centered deflector configuration could also be constructed by placing the grating facet within a large bearing assembly and rotating the inner part of the bearing assembly by a drive belt linked to a motor. Compared with the pancake motor construction, the drive belt configuration offers greater asymmetry in construction of the deflector, which should enable the focusing lens to be placed nearer to the facet center.

Scan duty cycle of the centered grating facet disc deflector in FIG. 8 can be doubled if a second centered PDG facet is superimposed on the first centered PDG facet. This second facet would be oriented to have its grating lines perpendicular to those of the first facet. This centered cross grating deflector produces four scans for each complete rotation of the hologon disc. For $K=1.4142$ and $\theta_s<20°$, there is no cross talk between cross gratings and only a single diffracted beam is generated per recording scan period. Thus, high radiometric system throughout efficiency is achieved for this quadrapole grating deflector. This quadrapole deflector can be constructed by closely air-spacing two glass discs, each having a centered PDG facet fabricated on it.

Cross-scan beam tracking error for the centered grating facet deflector is essentially zero if only one scan per disc revolution is used and is determined by the disc wobble angle and wedge angle when two scans per disc revolution are obtained for the dipole configuration. Grating facet periodicity error does not contribute to scan beam tracking error for the dipole case because the periodicity is the same for both scans. Scan beam tracking error associated with deflector wobble and disc wedge can be compensated for in the dipole case by mechanically adjusting the static wobble tilt angle of the disc within the deflector assembly. This adjustment is performed by means of set screws 80 located along the disc holder circumference.

From the foregoing description, it will be apparent that there has been provided improved hologon scanner apparatus which provides a cost-effective solution for many laser scanning applications, particularly in type and image setters.

Variations and modifications in the herein described scanners, within the scope of the invention, will undoubtedly suggest themselves to those skilled in the art. Accordingly the foregoing description should be taken as illustrative and not in a limiting sense.

We claim:

1. A hologon scanning system, for providing a beam of light which scans across an image plane, which comprises: a member having a planar diffraction grating with grating lines in a plane; means for holding and rotating said member about an axis of rotation perpendicular to said plane; means for illuminating said grating with a beam of light which is incident on said grating where said axis intersects said grating and at an angle of incidence of from about 25° to 45° and is diffracted therefrom to provide two sequential scans across said image plane per revolution of said member.

2. The system according to claim 1 wherein said member has a plurality of said diffraction gratings in superimposed relationship for producing a plurality of said pairs of sequential scans per revolution.

3. The system according to claim 2 wherein said superimposed gratings consist of first and second gratings having their lines in orthogonal relationship so as to provide two pairs of said sequential scans per revolution.

4. The system according to claim 1 wherein said member has a rim, said holding and rotating means is engagable with said member along said rim, said grating having a center coincident with the intersection of said rotation axis and said plane.

5. The system according to claim 4 wherein said holding and rotating means comprises a pancake motor having a rotor assembled to said rim and the stator around said rim.

6. The system according to claim 4 wherein said holding and rotating means comprises a cup-shaped holder having an open end through which said beam passes, said holder being rotatable about said axis, said holder engaging said member along said rim.

7. The system according to claim 1 wherein said member is light transmissive and said incident and diffracted beams are on opposite sides of said member.

8. The system according to claim 7 wherein said member is a disc having a rim, said holding and rotating means being provided by a cylindrical holder open at at least one end and engagable with said disc at the rim thereof, said holder having an axis along the axis of rotation, and a pair of diametrically opposed openings in said holders spaced from said member in a direction away from said one end through which openings said diffracted beam passes when executing different ones of said pair of scans.

9. The system according to claim 8 wherein a line through the center of said openings is perpendicular to the lines of said gratings.

10. The system according to claim 1 wherein said member is a disc having a rim and said rotating means comprises a bearing assembly having a stationary outer race and an inner race connected to said disc, and motor and pulley means for rotating said inner race whereby to rotate said member.

11. The system according to claim 1 wherein said member is a disc, said holding and rotating means comprises a cylindrical member rotatable about said rotation axis and having an inside wall and an end through which said incident beam passes and is incident upon said member and said grating where said rotation axis intersects said grating, a step in said inside wall, a yieldable ring member on said step, a retaining ring on said inside wall, said disc being disposed between said yieldable ring and said retaining ring and at least one adjustment member movable in said retaining ring and engagable with said disc to adjust the angle of the plane of said grating with respect to said rotation axis.

12. The system according to claim 11 wherein a plurality of said adjustment members are provided angularly spaced from each other around said retaining ring.

13. The system according to claim 1 wherein said grating defines a facet of area smaller than the area of said beam where it intersects said plane.

14. The system according to claim 13 wherein said facet is elliptical in shape and has a center and a major and minor diameter, said facet center being coincident with said rotation axis, and said grating lines being perpendicular to said major diameter.

15. The system according to claim 13 wherein said member is a disc having a diameter exceeding the maximum diameter of the profile of said incident beam on said grating only by an amount sufficient for said beam to be incident on said grating without obstruction by said holding and rotating means.

* * * * *